United States Patent
Takebayashi

(10) Patent No.: US 10,396,358 B2
(45) Date of Patent: Aug. 27, 2019

(54) NONAQUEOUS ELECTROLYTE SECONDARY BATTERY

(71) Applicant: TOYOTA JIDOSHA KABUSHIKI KAISHA, Toyota-shi, Aichi (JP)

(72) Inventor: Yoshitomo Takebayashi, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 400 days.

(21) Appl. No.: 15/342,518

(22) Filed: Nov. 3, 2016

(65) Prior Publication Data

US 2017/0133683 A1    May 11, 2017

(30) Foreign Application Priority Data

Nov. 5, 2015  (JP) ................................. 2015-217995

(51) Int. Cl.
*H01M 4/58*   (2010.01)
*H01M 4/13*   (2010.01)
(Continued)

(52) U.S. Cl.
CPC ........... *H01M 4/5825* (2013.01); *H01M 4/13* (2013.01); *H01M 4/62* (2013.01); *H01M 10/052* (2013.01);
(Continued)

(58) Field of Classification Search
CPC .... H01M 4/5825; H01M 4/131; H01M 4/133; H01M 4/587; H01M 4/13; H01M 4/62; H01M 4/505
See application file for complete search history.

(56) References Cited

U.S. PATENT DOCUMENTS 7,638,236 B2 * 12/2009 Ugaji .................... H01M 4/131
427/58
2007/0202411 A1   8/2007 Kim et al.
(Continued)

FOREIGN PATENT DOCUMENTS

CN        101145609 A      3/2008
CN        104393232 A      3/2015
(Continued)

OTHER PUBLICATIONS

Notification of Reasons for Refusal dated Feb. 1, 2018, in corresponding Japanese Application No. 2015-217995 (5 pages total).
(Continued)

*Primary Examiner* — Golam Mowla
(74) *Attorney, Agent, or Firm* — Sughrue Mion, PLLC

(57) ABSTRACT

The nonaqueous electrolyte secondary battery provided by the present invention has a positive electrode 50 that has a positive electrode active material layer 54, a negative electrode 60 that has a negative electrode active material layer 64, and separators 70, 72 interposed between the positive electrode active material layer 54 and the negative electrode active material layer 64. The positive electrode active material layer 54 contains a positive electrode active material and an inorganic phosphate compound that contains an alkali metal and/or an alkaline-earth metal. A phosphate ion scavenger that scavenges a phosphate ion is disposed between the positive electrode active material layer 54 and the negative electrode active material layer 64 and/or in the negative electrode active material layer 64.

3 Claims, 3 Drawing Sheets

(51) Int. Cl.
  *H01M 4/62* (2006.01)
  *H01M 10/052* (2010.01)
  *H01M 4/131* (2010.01)
  *H01M 4/133* (2010.01)
  *H01M 4/505* (2010.01)
  *H01M 4/587* (2010.01)

(52) U.S. Cl.
  CPC ............ *H01M 4/131* (2013.01); *H01M 4/133* (2013.01); *H01M 4/505* (2013.01); *H01M 4/587* (2013.01)

(56) References Cited

U.S. PATENT DOCUMENTS

| | | |
|---|---|---|
| 2008/0063941 A1 | 3/2008 | Itaya et al. |
| 2009/0087731 A1 | 4/2009 | Fukui et al. |
| 2010/0233550 A1 | 9/2010 | Yanagida et al. |
| 2014/0349166 A1 | 11/2014 | Chiga et al. |
| 2014/0377611 A1 | 12/2014 | Kwon et al. |
| 2015/0180036 A1 | 6/2015 | Takebayashi |
| 2015/0364790 A1 | 12/2015 | Yonehara et al. |

FOREIGN PATENT DOCUMENTS

| | | |
|---|---|---|
| CN | 104969384 A | 10/2015 |
| JP | 2000-011996 A | 1/2000 |
| JP | 2009-099523 A | 5/2009 |
| JP | 2009-527089 A | 7/2009 |
| JP | 2011-034943 A | 2/2011 |
| JP | 2013-030445 A | 2/2013 |
| JP | 2013-232357 A | 11/2013 |
| JP | 2014-103098 A | 6/2014 |
| JP | 2015-056222 A | 3/2015 |
| WO | 2012/073747 A1 | 6/2012 |
| WO | 2013/080722 A1 | 6/2013 |

OTHER PUBLICATIONS

Decision to Grant a Patent dated Jul. 26, 2018, in corresponding Japanese Application No. 2015-217995 (6 pages total).

* cited by examiner

NONAQUEOUS ELECTROLYTE SECONDARY BATTERY

CROSS-REFERENCE

This application cites priority based on Japanese Patent Application No. 2015-217995 filed Nov. 5, 2015, and the contents of that application are incorporated in their entirety in this Specification by reference.

BACKGROUND OF THE INVENTION

1. Field of the Invention

The present invention relates to a nonaqueous electrolyte secondary battery.

2. Description of the Related Art

Lithium ion secondary batteries and other nonaqueous electrolyte secondary batteries are increasingly important as vehicular power sources or as power sources for, e.g., personal computers and mobile devices. In particular, lithium ion secondary batteries, which are lightweight and provide high energy densities, are preferred for use as high-output vehicular power sources. A typical configuration of this type of nonaqueous electrolyte secondary battery is provided with an electrode assembly in which a positive electrode and a negative electrode are stacked with a separator interposed therebetween, the positive electrode having a structure in which a positive electrode active material layer containing a positive electrode active material is supported on a positive electrode current collector, and the negative electrode having a structure in which a negative electrode active material layer containing a negative electrode active material is supported on a negative electrode current collector. The following, for example, are used as the positive electrode active material: layer-structured lithium cobalt composite oxides (for example, $LiCoO_2$), layer-structured lithium nickel composite oxides (for example, $LiNiO_2$), spinel-structured lithium manganese composite oxides (for example, $LiMn_2O_4$), and spinel-structured nickel-containing lithium manganese composite oxides (for example, $LiMn_{1.5}Ni_{0.5}O_4$). Japanese Patent Application Laid-open No. 2014-103098 indicates that an inorganic phosphate compound that contains an alkali metal and/or alkaline-earth metal (for example, $Li_3PO_4$) is added to a positive electrode active material layer in a nonaqueous electrolyte secondary battery containing a positive electrode active material. According to Japanese Patent Application Laid-open No. 2014-103098, the elution of metal from the positive electrode active material can be reduced and the battery durability (for example, the capacity retention ratio) can be enhanced by the addition of this inorganic phosphate compound to the positive electrode active material layer.

SUMMARY OF THE INVENTION

However, according to investigations by the present inventor, while metal elution from the positive electrode active material is suppressed when an inorganic phosphate compound (for example, $Li_3PO_4$) is added to the positive electrode active material layer, the phosphate ion produced from the inorganic phosphate compound migrates via the electrolyte solution to the negative electrode and can, through its reaction with the charge carrier (for example, the lithium ion in a lithium ion secondary battery), cause deactivation of the charge carrier. The deactivation of the charge carrier can cause a deterioration in battery capacity.

The present invention was pursued considering these points, and a principal object of the present invention is to provide, for a nonaqueous electrolyte secondary battery that contains such an inorganic phosphate compound in its positive electrode active material layer, a nonaqueous electrolyte secondary battery in which the capacity deterioration caused by the phosphate ion produced from the inorganic phosphate compound is suppressed.

The nonaqueous electrolyte secondary battery provided by the present invention contains a positive electrode comprising a positive electrode active material layer, a negative electrode comprising a negative electrode active material layer, a separator interposed between the positive electrode active material layer and the negative electrode active material layer, and a nonaqueous electrolyte solution. The positive electrode active material layer contains an inorganic phosphate compound that contains an alkali metal and/or an alkaline-earth metal. In addition, a phosphate ion scavenger that scavenges a phosphate ion is disposed between the positive electrode active material layer and the negative electrode active material layer and/or in the negative electrode active material layer. Because the phosphate ion produced from the inorganic phosphate compound is scavenged by the phosphate ion scavenger, this constitution can suppress the capacity deterioration caused by this phosphate ion.

In one aspect of the herein disclosed nonaqueous electrolyte secondary battery, the inorganic phosphate compound is $Li_3PO_4$. In addition, the phosphate ion scavenger is at least one metal oxide particle selected from the group consisting of $ZrO_2$, $TiO_2$, and $BaTiO_3$. Moreover, the ratio (S/A) between the total surface area S $[m^2]$ of the metal oxide particles disposed between the positive electrode active material layer and the negative electrode active material layer and/or in the negative electrode active material layer and the total mass A [g] of the $Li_3PO_4$ present in the positive electrode active material layer is at least 1.15. An even better suppression of the capacity deterioration caused by the phosphate ion produced from the inorganic phosphate compound can be achieved when this aspect is carried out.

In one aspect of the herein disclosed nonaqueous electrolyte secondary battery, the metal oxide particles are present in the negative electrode active material layer. In addition, the content of the metal oxide particles present in the negative electrode active material layer is not more than 10 mass parts per 100 mass parts of the negative electrode active material. When this aspect is carried out, the inhibition of electronic conduction by the metal oxide particles in the negative electrode active material layer can be suppressed and an increase in battery resistance can then be suppressed.

In one aspect of the herein disclosed nonaqueous electrolyte secondary battery, the inorganic phosphate compound is $Li_3PO_4$. In addition, the phosphate ion scavenger is at least one metal hydroxide selected from the group consisting of $Al(OH)_3$ and $Fe(OH)_2$. Moreover, the ratio (B/A) between the total number of moles B [mol] of (OH) groups of the metal hydroxide disposed between the positive electrode active material layer and the negative electrode active material layer and/or in the negative electrode active material layer and the total mass A [g] of the $Li_3PO_4$ present in the positive electrode active material layer is at least 0.01 and not more than 0.082. An even better suppression of the capacity deterioration caused by the phosphate ion produced from the inorganic phosphate compound can be achieved when this aspect is carried out.

In one aspect of the herein disclosed nonaqueous electrolyte secondary battery, the metal hydroxide is present in the negative electrode active material layer. In addition, the content of the metal hydroxide present in the negative electrode active material layer is not more than 10 mass parts per 100 mass parts of the negative electrode active material. An increase in the battery resistance can be suppressed when this aspect is carried out.

In one aspect of the herein disclosed nonaqueous electrolyte secondary battery, the inorganic phosphate compound is $Li_3PO_4$. In addition, the phosphate ion scavenger is at least one layer compound selected from the group consisting of $Mg_6Al_2(OH)_{16}CO_3 \cdot 4H_2O$ and $Mg_6Al_2(Cl_2)(OH)_{16} \cdot 4H_2O$. Moreover, the ratio (C/A) between the total number of moles C [mmol] of the layer compound disposed between the positive electrode active material layer and the negative electrode active material layer and/or in the negative electrode active material layer and the total mass A [g] of the $Li_3PO_4$ present in the positive electrode active material layer is at least 1.1. An even better suppression of the capacity deterioration caused by the phosphate ion produced from the inorganic phosphate compound can be achieved when this aspect is carried out.

DESCRIPTION OF THE PREFERRED EMBODIMENTS

An embodiment of the present invention is described in the following. Matters required for the execution of the present invention but not particularly described in this Specification can be understood as design matters for the individual skilled in the art based on the conventional art in the pertinent field. The present invention can be implemented based on the contents disclosed in this Specification and the common general technical knowledge in the pertinent field. In this Specification, "secondary battery" refers generally to a storage device capable of undergoing repeated charging and discharging and is a term that encompasses such storage devices as electric double-layer capacitors and so-called storage batteries, e.g., lithium ion secondary batteries. In addition, "nonaqueous electrolyte secondary battery" refers to a battery that is provided with a nonaqueous electrolyte solution (typically an electrolyte solution that contains a supporting salt (supporting electrolyte) in a nonaqueous solvent). A "lithium ion secondary battery" refers to a secondary battery that utilizes the lithium ion as the electrolyte ion and that engages in charge/discharge through the migration of the lithium ion between the positive and negative electrodes. The electrode active material refers to a material capable of the reversible insertion and extraction of a chemical species that forms the charge carrier (the lithium ion in a lithium ion secondary battery).

A nonaqueous electrolyte secondary battery according to an embodiment of the present invention is described in the following based on the figures. Members and positions that exercise the same function are assigned the same reference symbol as appropriate. Each of the figures is a schematic depiction and does not necessarily reflect an actual object. Each of the figures only gives an example, and the present invention is not thereby limited unless specifically stated otherwise. Embodiments of the present invention are described herebelow using the application of the present invention to lithium ion secondary batteries as an example, but this should not be construed as limiting the scope of the application of the present invention.

<First Embodiment>

Figure 1:
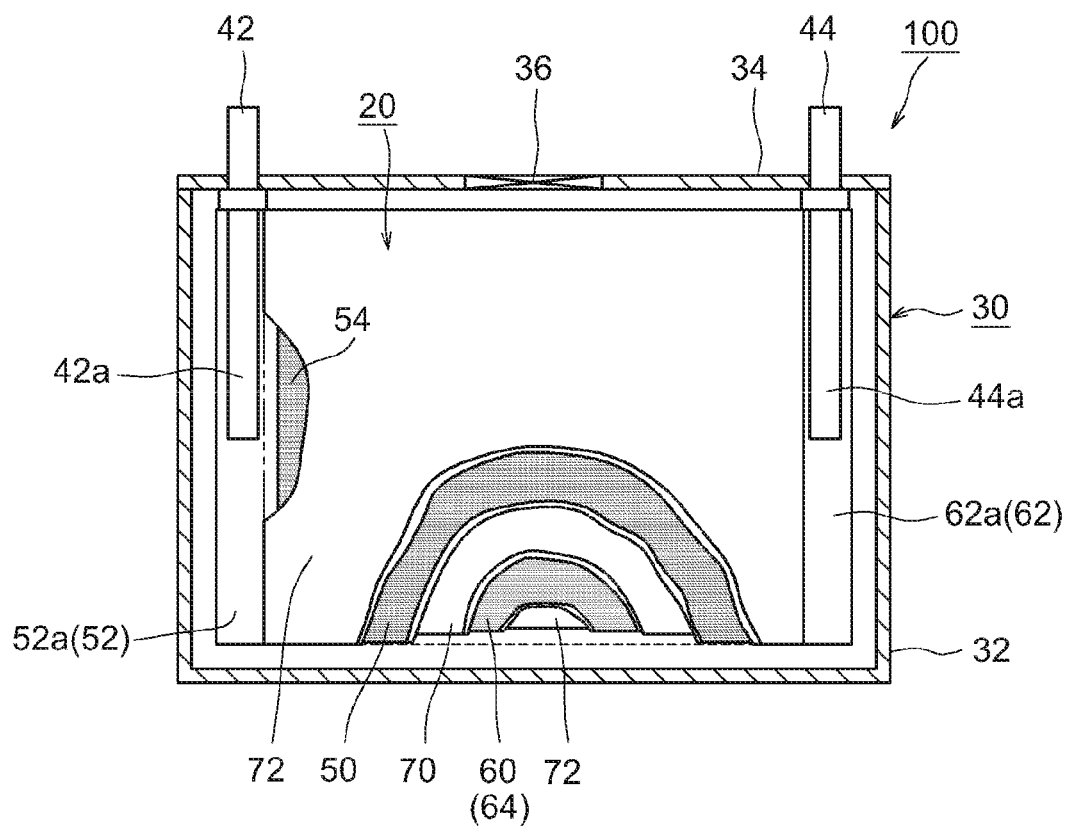
FIG. 1 is a diagram that shows an example of the structure of a lithium ion secondary battery according to an embodiment.
Figure 2:
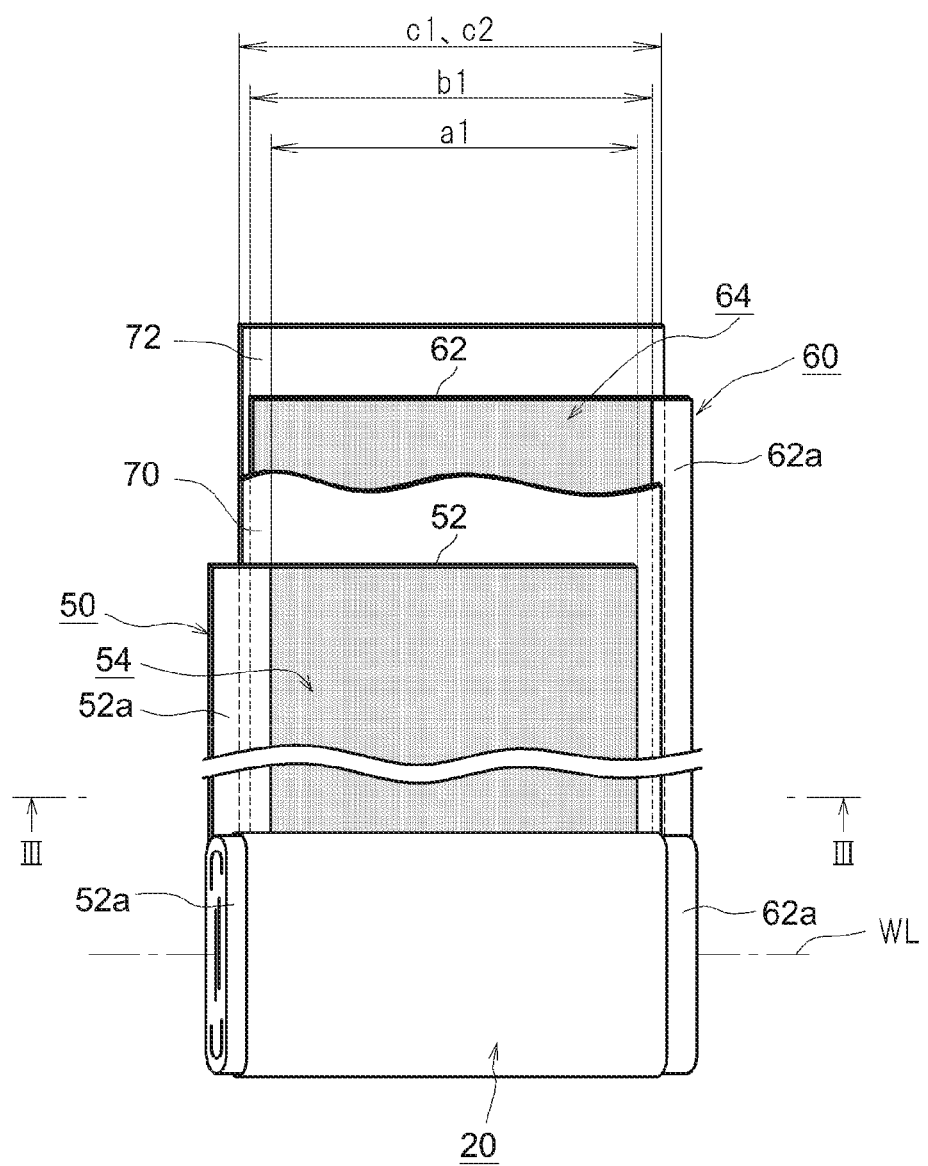
FIG. 2 is a diagram that shows a wound electrode assembly according to an embodiment.
Figure 3:
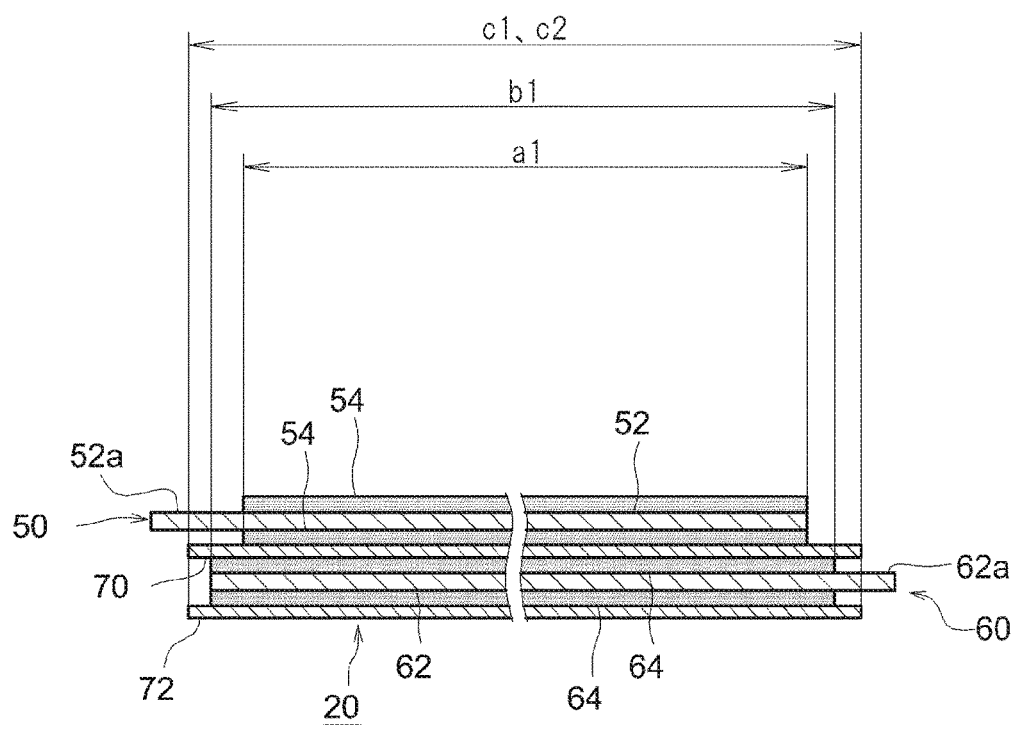
FIG. 3 is a cross-sectional diagram that shows the III-III cross section of FIG. 2.

FIG. 1 shows a lithium ion secondary battery 100 according to the present embodiment. As shown in FIG. 1, this lithium ion secondary battery 100 is provided with a wound electrode assembly 20 and a battery case 30. FIG. 2 is a diagram that shows the wound electrode assembly 20. FIG. 3 shows the III-III cross section in FIG. 2. As shown in FIGS. 1 and 2, the flat wound electrode assembly 20 of the lithium ion secondary battery 100 according to the present embodiment is housed, along with a liquid electrolyte (electrolyte solution) (not shown), in a flat rectangular battery case (i.e., an outer container) 30.

The battery case 30 is constituted of a box-shaped (i.e., a rectangular parallelepiped provided with a bottom) case main body 32 that has an opening at one end (corresponds to the upper end in the ordinary state in which the battery is used), and of a sealing plate (lid) 34 composed of a rectangular plate member that attaches to this opening and thereby closes the opening. The material of the battery case 30 is, for example, aluminum. As shown in FIG. 1, a positive electrode terminal 42 and a negative electrode terminal 44 for external connection are formed in the sealing plate 34. A thin-walled safety valve 36, which is constructed so as to release the internal pressure when the internal pressure in the battery case 30 rises to or exceeds a prescribed level, is formed between the two terminals 42, 44 on the sealing plate 34.

The wound electrode assembly 20 is provided with a long sheet-shaped positive electrode (positive electrode sheet 50), a long sheet-shaped negative electrode (negative electrode sheet 60) like that of the positive electrode sheet 50, and a total of two plies of a long sheet-shaped separator (separator 70, 72).

<Positive Electrode>

The positive electrode sheet 50 is provided with a strip-shaped positive electrode current collector 52 and a positive electrode active material layer 54. A strip-shaped aluminum foil having a thickness of about 15 μm is used for the positive electrode current collector 52. An uncoated region 52a is established along the edge on one side considered in the width direction of the positive electrode current collector 52. In the illustrated example, the positive electrode active material layer 54 is supported on both sides of the positive electrode current collector 52 excluding the uncoated region 52a established on the positive electrode current collector 52. The positive electrode active material layer 54 contains a positive electrode active material and an inorganic phosphate compound.

<Positive Electrode Active Material>

The various materials known to be usable as a positive electrode active material for lithium ion secondary batteries can be used without particular limitation as the positive electrode active material. For example, a lithium transition metal compound having, for example, a layer structure or spinel structure, and containing lithium (Li) and at least one transition metal element as constituent metal elements can be used.

A lithium nickel manganese composite oxide given by the following general formula (I)

$$Li_x(Ni_yMn_{2-y-z}Me^1_z)O_{4+\alpha} \quad (I)$$

is an example of the herein disclosed positive electrode active material. Here, the $Me^1$ can be any transition metal element other than Mn and Ni or can be a main group element (for example, one or two or more elements selected from Fe, Ti, Co, Cu, Cr, Zn, and Al). Or, it may be a semi-metal element (for example, one or two or more elements selected from B, Si, and Ge) or a nonmetal element. In addition, x is $0.8 \leq x \leq 1.2$; y is $0 < y$; z is $0 \leq z$; $y+z<2$ (typically $y+z \leq 1$); $\alpha$ is $-0.2 \leq \alpha \leq 0.2$ and is a value set so the condition of charge neutrality is satisfied; and q is $0 \leq q \leq 1$. For example, y is $0.2 \leq y \leq 1.0$ (typically $0.4 \leq y \leq 0.6$, for example, $0.45 \leq y \leq 0.55$) and z is $0 \leq z < 1.0$ (for example, $0 \leq z \leq 0.3$). For example, $LiNi_{0.5}Mn_{1.5}O_4$ is a specific example of a lithium nickel manganese oxide with general formula (I). The incorporation of Ni in $LiMn_2O_4$ can increase the positive electrode potential (versus $Li/Li^+$) at the point of completion of the charging of the spinel-structured lithium nickel manganese composite oxide (typically the potential is increased to at least 4.3 V, for example, to at least 4.5 V, for example, to 4.5 V to 5.2 V). This spinel-structured lithium nickel manganese composite oxide can contribute to raising the energy density of the battery.

Another example of the herein disclosed positive electrode active material is the typically layer-structured lithium transition metal composite oxide given by the general formula $LiMe^2O_2$. Here, $Me^2$ includes at least one species of transition metal element, e.g., Ni, Co, Mn, and so forth, and can additionally include another metal element or a nonmetal element. Specific examples are $LiNiO_2$ and $LiNi_{1/3}Co_{1/3}Mn_{1/3}O_2$. This layer-structured lithium transition metal composite oxide can contribute to raising the capacity of the battery.

The configuration of the positive electrode active material is not particularly limited, but it is typically a particulate. The average particle diameter of this particulate positive electrode active material can be generally about 1 μm to 20 μm (for example, 3 μm to 10 μm). In this Specification, the "average particle diameter" is the particle diameter ($D_{50}$, median diameter) corresponding to a cumulative 50% from the small particle diameter side in the volume-based particle size distribution based on a laser diffraction/light scattering method.

<Inorganic Phosphate Compound>

The herein disclosed positive electrode active material layer 54 contains, in addition to the positive electrode active material, an inorganic phosphate compound that contains an alkali metal and/or an alkaline-earth metal. The "inorganic phosphate compound" referenced here is a general term for inorganic compounds that have the phosphate skeleton $P_xO_y$, and is a concept that, for example, encompasses one or both of orthophosphate compounds containing the orthophosphate ion ($PO_4^{3-}$) and pyrophosphate compounds (diphosphate compounds) containing the pyrophosphate ion ($P_2O_7^{4-}$). This inorganic phosphate compound may be an inorganic phosphate compound composed substantially of only P, O, and an alkali metal and/or alkaline-earth metal. The alkali metal-containing inorganic phosphate compounds can be exemplified by phosphate compounds such as lithium phosphate ($Li_3PO_4$), sodium phosphate ($Na_3PO_4$), potassium phosphate ($K_3PO_4$), and dilithium sodium phosphate ($Li_2NaPO_4$); lithium aluminum germanium phosphate compounds such as $Li_{1.5}Al_{0.5}Ge_{1.5}(PO_4)_3$; and pyrophosphate compounds such as lithium pyrophosphate ($Li_4P_2O_7$), sodium pyrophosphate ($Na_4P_2O_7$), and potassium pyrophosphate ($K_4P_2O_7$). The alkaline-earth metal-containing inorganic phosphate compounds can be exemplified by phosphate compounds such as magnesium phosphate ($Mg_3(PO_4)_2$) and calcium phosphate ($Ca_3(PO_4)_2$) and pyrophosphate compounds such as magnesium pyrophosphate ($Mg_2P_2O_7$) and calcium pyrophosphate ($Ca_2P_2O_7$). Inorganic phosphate compounds containing both an alkali metal and an alkaline-earth metal can be exemplified by phosphate compounds such as sodium magnesium phosphate (MgNaPO$_4$). A single one of these inorganic phosphate compounds may be used by itself or a combination of two or more may be used. Among the preceding, $Li_3PO_4$ may be used.

This inorganic phosphate compound reacts with the acid produced by use of the battery and can thereby inhibit the elution of metal from the positive electrode active material. That is, when a positive electrode containing a positive electrode active material as described above is exposed to high potentials, the electrolyte solution on the surface of the positive electrode undergoes oxidative degradation with the production of acid, and this acid can cause the elution of metal (typically a transition metal such as Mn, Ni, and so forth) from the positive electrode active material. This metal elution can cause a decline in the battery capacity. However, by incorporating an inorganic phosphate compound in the positive electrode active material layer in accordance with the herein disclosed art, the acid produced by the oxidative degradation of the electrolyte solution is consumed by reacting with the inorganic phosphate compound. As a result, the occurrence of the acid-induced elution of metal is inhibited and the capacity deterioration can be suppressed.

In an embodiment of the herein disclosed art, the inorganic phosphate compound is a particulate. The average particle diameter of the inorganic phosphate compound is not particularly limited, and it can be exemplified by about 0.5 μm to 15 μm (typically 1 μm to 10 μm, for example, 2 μm to 5 μm) on a volume basis. By using an inorganic phosphate compound having such an average particle diameter, metal elution from the positive electrode active material can be effectively suppressed while lowering the internal resistance of the positive electrode (typically the positive electrode active material layer).

Viewed from the perspective of the metal elution from the positive electrode active material, the content (total mass A) of the inorganic phosphate compound present in the positive electrode active material layer, expressed per 100 mass parts of the positive electrode active material, is suitably generally at least 0.1 mass parts, for example, at least 0.5 mass parts and is typically at least 1 mass part, for example, at least 2 mass parts. The upper limit on the inorganic phosphate compound content is not particularly limited, but, viewed in terms of inhibiting an increase in the battery resistance, generally not more than 20 mass parts is suitable, for example, not more than 15 mass parts and typically not more than 10 mass parts, for example, not more than 5 mass parts. The herein disclosed art can be carried out by an embodiment in which, for example, the inorganic phosphate compound content is at least 2 mass parts and not more than 5 mass parts per 100 mass parts of the positive electrode active material.

<Other Constituent Components of the Positive Electrode Active Material Layer>

In addition to the positive electrode active material and inorganic phosphate compound, the positive electrode active material layer 54 may as necessary contain additives such as an electroconductive material, a binder (binding material), and so forth. An electroconductive powder material such as carbon powder or carbon fiber can be used as the electroconductive material. The carbon powder may be the various carbon blacks, for example, acetylene black.

The binder can be exemplified by various polymer materials. For example, a water-soluble or water-dispersible polymer material can be used when the positive electrode active material layer is formed using an aqueous composition (a composition for which the dispersion medium is water or a mixed medium in which water is the major component). The water-soluble or water-dispersible polymer material can be exemplified by cellulosic polymers such as carboxymethyl cellulose (CMC); fluororesins such as polytetrafluoroethylene (PTFE); and rubbers such as styrene-butadiene rubber (SBR). Or, a polymer material such as a vinyl halide resin, e.g., polyvinylidene fluoride (PVdF), or a polyalkylene oxide, e.g., polyethylene oxide (PEO), can be used when the positive electrode active material layer is formed using a solvent-based composition (a composition for which the dispersion medium is mainly an organic solvent). A single one of these binders may be used by itself or a combination of two or more may be used. In addition to use as a binder, the polymer materials provided above as examples may also be used as thickeners, dispersing materials, and other additives.

The proportion of the positive electrode active material in the overall positive electrode active material layer exceeds about 50 mass % and may be about 70 mass % to 97 mass % (for example, 75 mass % to 95 mass %). In addition, the proportion of the electroconductive material in the overall positive electrode active material layer may be about 2 mass % to 20 mass % (for example, 3 mass % to 10 mass %). The proportion of the binder in the overall positive electrode active material layer may be about 0.5 mass % to 10 mass % (for example, 1 mass % to 5 mass %).

The method of producing the positive electrode is not particularly limited and conventional methods can be used as appropriate. For example, the following method can be used. First, a positive electrode active material layer-forming composition in slurry form is prepared by mixing the positive electrode active material and inorganic phosphate compound, as necessary with an electroconductive material, binder, and so forth, in a suitable solvent. The mixing process can be carried out using, for example, a suitable kneader (for example, a planetary mixer). An aqueous solvent or an organic solvent can be used as the solvent here, and, for example, N-methyl-2-pyrrolidone (NMP) can be used. Then, the prepared composition is applied to the positive electrode current collector and the solvent present in the composition is removed. The composition applied to the positive electrode current collector may as necessary be compressed in order to provide a desired thickness and amount per unit area. Proceeding in this manner provides a positive electrode in which a positive electrode active material layer is supported on the positive electrode current collector. An appropriate coating apparatus, for example, a die coater, may be used as the method for applying the composition to the positive electrode current collector. A common drying means (for example, drying by the application of heat, vacuum drying, and so forth) may be used to remove the solvent.

<Negative Electrode>

As shown in FIG. 2, the negative electrode sheet 60 is provided with a strip-shaped negative electrode current collector 62 and a negative electrode active material layer 64. For example, a strip-shaped copper foil having a thickness of about 10 μm can be used as the negative electrode current collector 62. An uncoated region 62a is established along the edge on one side considered in the width direction of the negative electrode current collector 62. A negative electrode active material layer 64 is supported on both sides of the negative electrode current collector 62 excluding the uncoated region 62a established on the negative electrode current collector 62. The negative electrode active material layer 64 contains a negative electrode active material and a phosphate ion scavenger.

<Negative Electrode Active Material>

One or two or more of the materials heretofore used in lithium ion secondary batteries can be used without particular limitation as the negative electrode active material. The negative electrode active material can be exemplified by carbon materials such as graphite, hard carbon (graphitization-resistant carbon), and soft carbon (easily graphitizable carbon); metal oxide materials such as silicon oxide, titanium oxide, vanadium oxide, and lithium titanium composite oxide (LTO); and metal nitride materials such as lithium nitride, lithium cobalt composite nitride, and lithium nickel composite nitride. Graphitic carbon materials can be used among the preceding.

<Phosphate Ion Scavenger>

In addition to a negative electrode active material, the herein disclosed negative electrode active material layer 64 contains a phosphate ion scavenger that scavenges or captures the phosphate ion. The "phosphate ion" referenced here is a general term for ions that have the phosphate skeleton $P_xO_y$, and is a concept that encompasses, for example, one or both of the orthophosphate ion ($PO_4^{3-}$) and pyrophosphate ion ($P_2O_7^{4-}$). In addition, the "phosphate ion scavenger" refers to a substance that has a scavenging function for the phosphate ion produced by reaction between the aforementioned inorganic phosphate compound and acid (acid produced by use of the battery). The scavenging of the phosphate ion can be exemplified by scavenging mechanisms such as capture by adsorption, scavenging by reaction (chemical bonding) with the OH group, scavenging by incorporation into an interlayer region, and so forth.

The phosphate ion-induced capacity deterioration can be suppressed by this scavenging, by the phosphate ion scavenger, of the phosphate ion produced from the inorganic phosphate compound. That is, when phosphate ion is produced by the reaction of acid with the inorganic phosphate compound, this phosphate ion migrates to the negative electrode through the electrolyte solution and accumulates at the surface of the negative electrode active material and reacts with the lithium ion and can thereby cause a deactivation of the lithium ion (and thus a deterioration in the capacity). However, in accordance with the herein disclosed art, this phosphate ion-induced capacity deterioration can be suppressed because the phosphate ion scavenger scavenges the phosphate ion produced by the reaction between the acid and inorganic phosphate compound.

<Metal Oxide Particles (Phosphate Ion Scavenger)>

In this embodiment, particles of a metal oxide (i.e., a compound that contains oxygen and a metal element) that exercises a phosphate ion-adsorbing function are used as the phosphate ion scavenger. Any metal oxide particle that has the capacity to adsorb the phosphate ion at its surface can be used as the metal oxide particle without particular limitation. For example, a metal oxide particle constituted mainly of an oxide containing any metal element belonging to Groups 4 to 14 of the Periodic Table (for example, a ceramic) can be used. Among the preceding, a metal oxide particle constituted mainly of any metal element selected from Zr, Ti, Ba, Mg, Zn, Ni, and Fe can be used. Specific examples are particles such as zirconium oxide (for example, zirconia ($ZrO_2$)) particles, titanium oxide (for example, titania ($TiO_2$)) particles, calcium oxide (for example, calcia) particles, zinc oxide particles, iron oxide particles, nickel oxide particles, cerium oxide (for example, ceria) particles, magnesium oxide (for example, magnesia) particles, chromium oxide particles, manganese dioxide particles, barium titanate ($BaTiO_3$) particles, calcium carbonate particles, and barium carbonate particles. These particles are preferred for their ability to effectively adsorb the phosphate ion. A single one of these particles may be used by itself or a combination of two or more may be used. Zirconia particles, titania particles, and barium titanate particles can be used among the preceding.

The metal oxide particle in the herein disclosed art can be a particulate having an average particle diameter of about 0.1 μm to 10 μm (typically 0.5 μm to 5 μm). In addition, the BET specific surface area of the metal oxide particle is suitably generally about 0.5 $m^2$/g to 10 $m^2$/g and typically 1 $m^2$/g to 10 $m^2$/g, for example, about 1.2 $m^2$/g to 5 $m^2$/g can be used. A more efficient phosphate ion scavenging at small amounts of addition can be achieved by having the BET specific surface area of the metal oxide particle be within this range. In this Specification, the "specific surface area" indicates the surface area (BET specific surface area) measured by the BET method (single-point BET method) using nitrogen gas.

Because the phosphate ion scavenging mode is adsorption to the particle surface, the content of the metal oxide particle present in the negative electrode active material layer will depend on the surface area of the particle and on the amount of addition of the inorganic phosphate compound. For example, when the inorganic phosphate compound is $Li_3PO_4$ and the metal oxide particle is at least one selected from $ZrO_2$, $TiO_2$, and $BaTiO_3$, the ratio (S/A) between the total surface area S [$m^2$] of the metal oxide particle present in the negative electrode active material layer and the total mass A [g] of the $Li_3PO_4$ present in the positive electrode active material layer may be generally at least 1.15. When this ratio (S/A) is made at least 1.15, the phosphate ion produced from the $Li_3PO_4$ can be favorably scavenged and the capacity deterioration can be more effectively suppressed. This ratio (S/A) may be, for example, at least 1.5 and is typically at least 2, for example, at least 3. The upper limit on this ratio (S/A) is not particularly limited, but generally may be not more than 15, for example, not more than 10, and may typically be not more than 5, for example, not more than 4.

The content of the metal oxide particle present in the negative electrode active material layer is generally not more than 20 mass parts per 100 mass parts of the negative electrode active material. The content of the metal oxide particle may be not more than 10 mass parts per 100 mass parts of the negative electrode active material. When this is done, the inhibition of electronic conduction by the metal oxide particles in the negative electrode active material layer can be suppressed and an increase in battery resistance can then be restrained. Viewed in terms of suppressing an increase in resistance, the content of the metal oxide particle, per 100 mass parts of the negative electrode active material, is, for example, not more than 8 mass parts and typically not more than 5 mass parts. In addition, the content of the metal oxide particle, per 100 mass parts of the negative electrode active material, may be, for example, at least 0.5 mass parts and typically may be at least 1 mass part, for example, at least 2 mass parts. The herein disclosed art can be carried out, for example, by an embodiment in which the content of the metal oxide particle is at least 3 mass parts and not more than 10 mass parts per 100 mass parts of the negative electrode active material.

<Other Constituent Components in the Negative Electrode Active Material Layer>

In addition to the negative electrode active material and phosphate ion scavenger, the negative electrode active material layer 64 can as necessary contain additives such as a binder, a thickener, and so forth. The same binders as described for the positive electrode active material layer 54 can be used for the binder and thickener used in the negative electrode active material layer 64.

The proportion of the negative electrode active material in the overall negative electrode active material layer exceeds about 50 mass % and may be about 80 mass % to 99.5 mass % (for example, 90 mass % to 99 mass %). In addition, the proportion of the binder in the overall negative electrode active material layer may be about 0.5 mass % to 5 mass % (for example, 1 mass % to 2 mass %). The proportion of the thickener in the overall negative electrode active material layer may be about 0.5 mass % to 5 mass % (for example, 1 mass % to 2 mass %).

The method of producing the negative electrode is not particularly limited and conventional methods can be used as appropriate. For example, the following method can be used. First, a negative electrode active material layer-forming composition in slurry form is prepared by mixing the negative electrode active material and phosphate ion scavenger, as necessary with a binder, thickener, and so forth, in a suitable solvent. The mixing process can be carried out using, for example, a suitable kneader (for example, a planetary mixer). An aqueous solvent or an organic solvent can be used as the solvent here; for example, water can be used. Then, the prepared composition is applied to the negative electrode current collector and the solvent present in the composition is removed. The composition applied to the negative electrode current collector may as necessary be compressed in order to provide a desired thickness and amount per unit area. Proceeding in this manner provides a negative electrode in which a negative electrode active material layer is supported on the negative electrode current collector. An appropriate coating apparatus, for example, a die coater, may be used as the method for applying the composition to the negative electrode current collector. A common drying means (for example, drying by the application of heat, vacuum drying, and so forth) may be used to remove the solvent.

<Separator>

The separator 70, 72 is a member that separates the positive electrode sheet 50 from the negative electrode sheet 60. In this example, the separator 70, 72 contains a strip-shaped substrate having a prescribed width and having a plurality of microfine pores. This substrate can be, for example, a sheet substrate having a monolayer structure (for example, a monolayer structure of polyethylene) constituted of a porous polyolefin resin or a sheet substrate having a laminated structure (for example, a three-layer structure of polypropylene and polyethylene and polypropylene). As shown in FIGS. 2 and 3, the width b1 of the negative electrode active material layer 64 is wider than the width a1 of the positive electrode active material layer 54. In addition, the widths c1 and c2 of the separators 70 and 72 are wider than the width b1 of the negative electrode active material layer 64 (c1, c2>b1>a1).

In the wound electrode assembly 20, the positive electrode sheet 50 and the negative electrode sheet 60 are stacked with the positive electrode active material layer 54 facing the negative electrode active material layer 64 and with separators 70 and 72 interposed therebetween. Moreover, the negative electrode current collector 62 and the positive electrode current collector 52 are stacked such that the uncoated regions 52a and 62a extend out on opposite sides from each other considered in the width direction of the wound electrode assembly 20. The stacked sheet materials (for example, the positive electrode sheet 50) are wound around a winding axis WL established in the width direction.

The wound electrode assembly 20 is attached to the electrode terminals 42 and 44, which are themselves attached to the battery case 30 (the sealing plate 34 in this example). The wound electrode assembly 20 is pressed flat in a single direction orthogonal to the winding axis and is housed in this state in the battery case 30. In addition, in the wound electrode assembly 20, the uncoated region 52a of the positive electrode sheet 50 and the uncoated region 62a of the negative electrode sheet 60 extend out on opposite sides from each other in the width direction of the separators 70 and 72. Of these, one of the electrode terminals 42 is fixed to the uncoated region 52a of the positive electrode current collector 52 and the other electrode terminal 44 is fixed to the uncoated region 62a of the negative electrode current collector 62. This wound electrode assembly 20 is housed in the flat interior space of the case main body 32. After insertion of the wound electrode assembly 20, the case main body 32 is closed by the sealing plate 34.

<Nonaqueous Electrolyte Solution>

The nonaqueous electrolyte solution of the herein disclosed nonaqueous electrolyte secondary battery typically assumes a liquid state at normal temperature (for example, 25° C.); for example, it continuously assumes a liquid state within the temperature range of use (for example, −20° C. to 60° C.). The solution or dispersion of a supporting salt (for example, a lithium salt, sodium salt, magnesium salt, and so forth; a lithium salt for a lithium ion secondary battery) in a nonaqueous solvent can be used as the nonaqueous electrolyte solution. A supporting salt selected, as appropriate, from among the same supporting salts as for common nonaqueous electrolyte secondary batteries can be used as the supporting salt; for example, a lithium salt, e.g., $LiPF_6$, $LiBF_4$, $LiClO_4$, $LiAsF_6$, $Li(CF_3SO_2)_2N$, $LiCF_3SO_3$, and so forth can be used. $LiPF_6$ can be used among these. The concentration of this supporting salt may be adjusted to be into the range from 0.7 mol/L to 1.3 mol/L.

The organic solvents, e.g., various carbonates, ethers, esters, nitriles, sulfones, lactones, and so forth, used in common nonaqueous electrolyte secondary batteries can be used without particular limitation as the nonaqueous solvent. Specific examples are ethylene carbonate (EC), propylene carbonate (PC), diethyl carbonate (DEC), dimethyl carbonate (DMC), and ethyl methyl carbonate (EMC).

In one particular embodiment, the nonaqueous electrolyte solution contains a fluorine-containing nonaqueous solvent. For example, the fluoride of an organic solvent (organic compound) known to be usable as a nonaqueous solvent for nonaqueous electrolyte secondary batteries can be used as the fluorine-containing nonaqueous solvent. In other words, an organic solvent can be used that has a chemical structure provided by the substitution of the fluorine atom for at least one hydrogen atom in an organic solvent that does not have fluorine as a constituent element (for example, the aforementioned carbonates, ethers, esters, nitriles, sulfones, and lactones). One or two or more fluorinated carbonates from among these can be incorporated. By doing this, a higher oxidation potential (higher oxidation resistance) can be realized. The fluorinated carbonates can be exemplified by fluorinated cyclic carbonates such as monofluoroethylene carbonate (MFEC) and difluoroethylene carbonate (DFEC) and by fluorinated chain carbonates such as fluoromethyl methyl carbonate, difluoromethyl methyl carbonate, trifluoromethyl methyl carbonate, and fluoromethyl difluoromethyl carbonate (TFDMC).

In one particular embodiment, at least one fluorinated chain carbonate and at least one fluorinated cyclic carbonate are present as fluorine-containing nonaqueous solvents. With a nonaqueous electrolyte having such a composition, the fluorinated chain carbonate (for example, a fluorinated straight-chain carbonate) can function to make the nonaqueous electrolyte solution a liquid at normal temperature (for example, 25° C.) or to lower the viscosity of the nonaqueous electrolyte solution.

Using 100 mass % for the total of the components excluding the supporting salt from the nonaqueous electrolyte, the fluorine-containing nonaqueous solvent may be contained in a proportion of at least 1 mass % (typically 5 mass % to 100 mass %, for example, 30 mass % to 100 mass %, for example, 50 mass % to 100 mass %) and may be substantially 100 mass % (typically at least 99 mass %) of the components other than the supporting salt. Or, both a fluorine-containing nonaqueous solvent and a nonaqueous solvent lacking fluorine as a constituent element may be contained. In this case, the proportion for the fluorine atom-free nonaqueous solvent may be, for example, a proportion that is not more than 70 mass % of the components other than the supporting salt present in the electrolyte, and typically can be not more than 60 mass % (for example, not more than 50 mass %).

<Second Embodiment>

In a second embodiment, a metal hydroxide (i.e., a metal compound having the hydroxide ion ($OH^-$)) possessing the capacity to scavenge the phosphate ion through reaction with the OH group is used as the phosphate ion scavenger. A description of the other features is omitted here since they are the same as in the first embodiment.

<Metal Hydroxide (Phosphate Ion Scavenger)>

Any metal hydroxide that has a scavenging function through reaction of the phosphate ion with the OH group (chemical bonding) can be used without particular limitation as the metal hydroxide (typically a particulate) used as the phosphate ion scavenger. The metal constituent in the metal hydroxide can be exemplified by aluminum, iron, magnesium, calcium, manganese, copper, zinc, and so forth. Aluminum and iron are typical examples. The metal hydroxide can be specifically exemplified by aluminum hydroxide ($Al(OH)_3$), iron hydroxide ($Fe(OH)_2$), magnesium hydroxide ($Mg(OH)_2$), calcium hydroxide ($Ca(OH)_2$), manganese hydroxide ($Mn(OH)_2$), copper hydroxide ($Cu(OH)_2$), and zinc hydroxide ($Zn(OH)_2$). Aluminum hydroxide and iron hydroxide can be used among the preceding.

Because the phosphate ion scavenging mode is the reaction between the phosphate ion and the OH group, the content of the metal hydroxide in the negative electrode active material layer will depend on the number of moles of OH group in the metal hydroxide and the amount of addition for the inorganic phosphate compound. For example, when the inorganic phosphate compound is $Li_3PO_4$ and the metal hydroxide is at least one of $Al(OH)_3$ and $Fe(OH)_2$, the ratio (B/A) between the total number of moles B [mol] of (OH) groups of the metal hydroxide present in the negative electrode active material layer and the total mass A [g] of the $Li_3PO_4$ present in the positive electrode active material layer may be about at least 0.01 and not more than 0.082. By having this ratio (B/A) be at least 0.01 and not more than 0.082, the phosphate ion produced from the $Li_3PO_4$ can be favorably scavenged and the capacity deterioration can be even more effectively suppressed. Viewed from the standpoint of suppression of the capacity deterioration, this ratio (B/A) may typically be at least 0.01 and not more than 0.043, for example, at least 0.02 and not more than 0.035.

The content of the metal hydroxide present in the negative electrode active material layer generally is not more than 20 mass parts per 100 mass parts of the negative electrode active material. The content of the metal hydroxide may be not more than 10 mass parts per 100 mass parts of the negative electrode active material. When the content of the metal hydroxide is too high, secondary products may be produced by the decomposition of the metal hydroxide upon exposure to the negative electrode potential and the battery resistance may then assume an increasing trend due to these secondary products. Viewed in terms of suppressing a resistance increase, the content of the metal hydroxide, per 100 mass parts of the negative electrode active material, is, for example, not more than 5 mass parts and typically not more than 3 mass parts. In addition, the content of the metal hydroxide, per 100 mass parts of the negative electrode active material, may be, for example, at least 0.5 mass parts and typically at least 1 mass part, for example, at least 2 mass parts. The herein disclosed art can be carried out by an embodiment in which the content of the metal hydroxide is, for example, at least 1 mass part and not more than 5 mass parts per 100 mass parts of the negative electrode active material.

<Third Embodiment>

In the third embodiment, a layer compound having the capacity to scavenge the phosphate ion through the incorporation (insertion) of the phosphate ion into an interlayer region is used as the phosphate ion scavenger. A description of the other features is omitted here since they are the same as in the first embodiment.

<Layer Compound (Phosphate Ion Scavenger)>

Any layer compound that has a scavenging function in which the phosphate ion is incorporated into an interlayer region can be used without particular limitation as the layer compound (typically a particulate) used as the phosphate ion scavenger. It can be, for example, a layered double hydroxide (hydrotalcite) given by the following general formula (II).

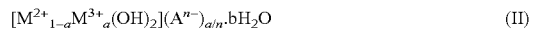

$$[M^{2+}_{1-a}M^{3+}_a(OH)_2](A^{n-})_{a/n} \cdot bH_2O \quad (II)$$

Here, $M^{2+}$ represents a divalent metal ion; $M^{3+}$ represents a trivalent metal ion; and $A^{n-}$ represents an n-valent anion. a is in the range $0.05 \leq a \leq 0.34$ and b is in the range $0.1 \leq b \leq 0.7$.

The $M^{2+}$ in general formula (II) can be exemplified by one or two or more of $Mg^{2+}$, $Mn^{2+}$, $Fe^{2+}$, $Co^{2+}$, $Ni^{2+}$, $Cu^{2+}$, and $Zn^{2+}$, and is typically $Mg^{2+}$. The $M^{3+}$ can be exemplified by one or two or more of $Al^{3+}$, $Fe^{3+}$, $Cr^{3+}$, $Co^{3+}$, and $In^{3+}$, and is typically $Al^{3+}$. The $A^{n-}$ can be exemplified by one or two or more of $OH^-$, $F^-$, $Cl^-$, $Br^-$, $NO_3^-$, $CO_3^{2-}$, $SO_4^{2-}$, $Fe(CN)_6^{3-}$, $CH_3COO^-$, the oxalate ion, and the salicylate ion, and is typically $CO_3^{2-}$ or $Cl^-$. The a may be, for example, $0.2 \leq a \leq 0.3$ and is typically $0.22 \leq a \leq 0.26$. The b may be, for example, $0.3 \leq b \leq 0.6$ and is typically $0.45 \leq b \leq 0.55$. The layered double hydroxide (hydrotalcite) can be specifically exemplified by $Mg_6Al_2(OH)_{16}CO_3 \cdot 4H_2O$, $Mg_6Al_2(Cl_2)(OH)_{16} \cdot 4H_2O$, $Mg_4Al_2(OH)_{12}CO_3 \cdot 3H_2O$, $Mg_{4.5}Al_2(OH)_{13}CO_3 \cdot 3.5H_2O$, and $Mg_{3.5}Zn_{0.5}Al_2(OH)_{12}CO_3 \cdot 3H_2O$. Among the preceding, $Mg_6Al_2(OH)_{16}CO_3 \cdot 4H_2O$ and/or $Mg_6Al_2(Cl_2)(OH)_{16} \cdot 4H_2O$ may be used.

Because the phosphate ion scavenging mode is insertion of the phosphate ion in the interlayer region, the content of the layer compound present in the negative electrode active material layer will depend on the number of moles of the layer compound and the amount of addition of the inorganic phosphate compound. When, for example, the inorganic phosphate compound is $Li_3PO_4$ and the layer compound is at least one of $Mg_6Al_2(OH)_{16}CO_3 \cdot 4H_2O$ and $Mg_6Al_2(Cl_2)(OH)_{16} \cdot 4H_2O$, the ratio (C/A) between the total number of moles C [mmol] of the layer compound present in the negative electrode active material layer and the total mass A [g] of the $Li_3PO_4$ present in the positive electrode active material layer generally may be at least 1.1. By having this ratio (C/A) be at least 1.1, the phosphate ion produced from the $Li_3PO_4$ can be favorably scavenged by the layer compound and the capacity deterioration can be even more effectively suppressed. Viewed from the standpoint of suppression of the capacity deterioration, this ratio (C/A) may be, for example, at least 1.5 and may typically be at least 2, for example, at least 3. The upper limit on this ratio (C/A) is not particularly limited, but generally may be not more than 15, for example, not more than 10, and typically may be not more than 7, for example, not more than 4.

The content of the layer compound present in the negative electrode active material layer can be not more than 20 mass parts (for example, less than 20 mass parts) per 100 mass parts of the negative electrode active material. When this is done, the inhibition of electronic conduction by the layer compound in the negative electrode active material layer can be suppressed and an increase in battery resistance can then be suppressed. Viewed in terms of suppressing an increase in resistance, the content of the layer compound, per 100 mass parts of the negative electrode active material, is, for example, not more than 10 mass parts and is typically not more than 5 mass parts, for example, not more than 3 mass parts. In addition, the content of the layer compound, per 100 mass parts of the negative electrode active material, may be, for example, at least 0.5 mass parts and may typically be at least 1 mass part, for example, at least 2 mass parts. The herein disclosed art can be carried out by an embodiment in which the content of the layer compound, per 100 mass parts of the negative electrode active material, is, for example, at least 3 mass parts and not more than 10 mass parts.

The phosphate ion scavenger is disposed in the negative electrode active material layer 64 in each of the embodiments described above, but the present invention is not limited to this. The phosphate ion scavenger may be disposed between the positive electrode active material layer 54 and the negative electrode active material layer 64. For example, a scavenging layer containing the phosphate ion scavenger may be formed at the surface of the separator 70, 72. Or, a scavenging layer containing the phosphate ion scavenger may be formed at the surface of the positive electrode active material layer 54 and/or the negative electrode active material layer 64. This scavenging layer may be a porous heat resistance layer (HRL) containing filler particles (for example, alumina) and a binder. There are no particular limitations on the method for forming the scavenging layer, and, for example, an example here is a method in which a scavenger layer-forming composition containing the phosphate ion scavenger and a suitable solvent (for example, NMP or water) is coated on the surface of the separator 70, 72 and/or the positive electrode active material layer 54 and/or the negative electrode active material layer 64 followed by drying. Or, the phosphate ion scavenger may be supported in the pores of the porous material of the separator 70, 72. Even when the phosphate ion scavenger is disposed in this manner between the positive electrode active material layer 54 and the negative electrode active material layer 64, the phosphate ion can be scavenged in the interval up until the phosphate ion produced at the positive electrode reaches the negative electrode, and the deterioration in capacity can thereby be suppressed. The phosphate ion scavenger may be disposed both in the negative electrode active material layer 64 and between the positive electrode active material layer 54 and the negative electrode active material layer 64.

Several examples for the present invention are described in the following, but this should not be construed to mean that the present invention is limited to or by these examples.

<Test Example 1>

In this example, evaluation laminate cells (lithium ion secondary batteries) according to Examples 1 to 12 were fabricated using $Li_3PO_4$ as the inorganic phosphate compound and using metal oxide particles as the phosphate ion scavenger, and charge-discharge cycle testing was carried out. The specific method is described in the following.

The positive electrode for the evaluation cell was produced as follows. First, a positive electrode active material layer composition was prepared by mixing a spinel-structured lithium nickel manganese composite oxide ($LiNi_{0.5}Mn_{1.5}O_4$; Ti- and Fe-doped product; average particle diameter=7 μm) powder as the positive electrode active material, $Li_3PO_4$ as the inorganic phosphate compound, AB as the electroconductive material, and PVdF as the binder in NMP at a (positive electrode active material+$Li_3PO_4$):electroconductive material:binder mass ratio of 89:8:3. This positive electrode active material layer composition was coated on one side of a long sheet-shaped aluminum foil (positive electrode current collector) and was dried to produce a positive electrode having a positive electrode active material layer disposed on one side of a positive electrode current collector.

The negative electrode for the evaluation cell was produced as follows. First, a negative electrode active material layer composition was prepared by dispersing graphite as the negative electrode active material, metal oxide particles as the phosphate ion scavenger, SBR as the binder, and CMC as the thickener in water at a (negative electrode active material+metal oxide particle):binder:thickener mass ratio of 98:1:1. This negative electrode active material layer composition was coated on one side of a long sheet-shaped copper foil (negative electrode current collector) to produce a negative electrode having a negative electrode active material layer disposed on one side of a negative electrode current collector.

A separator constituted of a microporous film substrate having a three-layer structure of polypropylene/polyethylene/polypropylene (PP/PE/PP film) was prepared as the separator for the evaluation cell.

The evaluation laminate cells of Examples 1 to 12 were fabricated using the positive electrode, negative electrode, and separator prepared as described above. Thus, an electrode assembly was produced by stacking the positive electrode and negative electrode produced as described above, with the active material layers of the two electrodes facing each other and with the separator interposed therebetween. Then, this electrode assembly was housed along with a nonaqueous electrolyte solution in a bag-shaped laminate battery container, followed by sealing to produce the evaluation laminate cell. The nonaqueous electrolyte solution used for the evaluation laminate cell was a nonaqueous electrolyte solution that contained $LiPF_6$ as the supporting salt at a concentration of approximately 1 mol/L in a mixed solvent that contained monofluoroethylene carbonate (MFEC) and trifluorodimethyl carbonate (TFDMC) in a 1:1 volumetric ratio.

Table 1 gives, for the evaluation cells of Examples 1 to 12, the $Li_3PO_4$ content (mass parts) per 100 mass parts of the positive electrode active material, the type and specific surface area of the metal oxide particle used, the content (mass parts) of the metal oxide particle per 100 mass parts of the negative electrode active material, and the ratio (S/A) between the total surface area S [$m^2$] of the metal oxide particles in the negative electrode active material layer and the total mass A [g] of the $Li_3PO_4$ in the positive electrode active material layer. In Example 1, the evaluation cell was fabricated without using $Li_3PO_4$ and without using metal oxide particles. In Example 2, the evaluation cell was fabricated without using metal oxide particles. In addition, the total surface area S of the metal oxide particles in the negative electrode active material layer was calculated from the specific surface area of the metal oxide particles and the total mass of the metal oxide particles in the negative electrode active material layer.

The thusly fabricated evaluation cells of Examples 1 to 12 were submitted to a conditioning step, measurement of the initial capacity, measurement of the initial IV resistance, and a charge-discharge cycle test. These are described in sequence in the following.

<Conditioning Step>

The conditioning step was carried out in accordance with the following procedures 1 to 3.

Procedure 1: charge to 4.9 V at a constant current of ⅓ C and pause for 10 minutes after reaching 4.9 V.

Procedure 2: discharge to 3.5 V at a constant current of ⅓ C and pause for 10 minutes after reaching 3.5 V.

Procedure 3: Repeat procedures 1 and 2 an additional two times.

<Measurement of the Initial Capacity>

Then, after this conditioning step, the initial capacity was measured on the evaluation cells at a temperature of 25° C. and in the voltage range from 3.5 V to 4.75 V using the following procedures 1 and 2.

Procedure 1: constant-current charging at 1 C; when 4.75 V is reached, continue to charge while lowering the current at that time so as to provide a constant voltage at 4.75 V; terminate charging when the current becomes 0.02 C. Pause for 20 minutes after charging.

Procedure 2: After procedure 1, discharge by constant-current discharge at 1 C to 3.5 V.

Here, the discharge capacity in the constant-current discharge in procedure 2 was taken to be the initial capacity (rated battery capacity).

<Measurement of the Initial Resistance>

The initial resistance (IV resistance) was measured here in order to evaluate the output characteristics of the evaluation cells. The initial resistance was determined at a temperature of 25° C. using the following procedures.

Procedure 1: bring the state of charge to 60% SOC by SOC adjustment.

Procedure 2: after procedure 1, carry out a 10-second discharge process at a constant current of 1 C, 3 C, 5 C, and 10 C.

Here, the initial resistance was determined from the 10-second voltage change for discharge at each rate in procedure 2. The results are given in the corresponding column in Table 1.

<Charge-discharge Cycle Test>

A charge-discharge cycle test was run on each of the evaluation cells of Examples 1 to 12 by carrying out the following charge-discharge cycle continuously for 200 times at room temperature (approximately 25° C.): charging at a constant current of 2 C until 4.75 V was reached followed by discharging at a constant current of 2 C until 3.5 V was reached.

The capacity retention ratio was calculated from the initial capacity (initial capacity of the lithium ion battery) prior to the charge-discharge cycle test and the battery capacity after the charge-discharge cycle test. Here, the battery capacity after the charge-discharge cycle test was measured by the same procedures as used for the initial capacity as described above. This capacity retention ratio was determined using "battery capacity after the charge-discharge cycle test/initial capacity before the charge-discharge cycle test"×100. The results are given in Table 1.

active material layer and the presence of the metal oxide particles in the negative electrode active material layer. For the batteries submitted to testing here, a low resistance, of not more than 2Ω, could be realized by having the content of the metal oxide particles be not more than 10 mass parts per 100 mass parts of the negative electrode active material. Viewed in terms of reducing the resistance, the content of the metal oxide particles may be not more than 10 mass parts per 100 mass parts of the negative electrode active material.

<Test Example 2>

Evaluation laminate cells according to Examples 13 to 19 were fabricated in this example using a metal hydroxide as the phosphate ion scavenger in place of the metal oxide particle. The evaluation laminate cells were fabricated using the same procedures as in the above-described Examples 1

TABLE 1

| | positive electrode | negative electrode metal oxide particle | | total surface | | |
|---|---|---|---|---|---|---|
| | $Li_3PO_4$ content (mass parts) | type | content (mass parts) | specific surface area ($m^2/g$) | area S of the metal oxide/ total $Li_3PO_4$ mass A ($m^2/g$) | capacity retention ratio (%) | initial resistance (Ω) |
| Example 1 | none | none | — | — | — | 73.1 | 1.26 |
| Example 2 | 3 | none | — | — | — | 86.2 | 1.64 |
| Example 3 | 3 | $ZrO_2$ | 5 | 1.2 | 1.33 | 88.1 | 1.7 |
| Example 4 | 3 | $ZrO_2$ | 10 | 1.2 | 2.54 | 87.8 | 1.76 |
| Example 5 | 3 | $ZrO_2$ | 20 | 1.2 | 4.66 | 87.9 | 2.02 |
| Example 6 | 3 | $TiO_2$ | 3 | 2.3 | 1.56 | 88.3 | 1.6 |
| Example 7 | 3 | $TiO_2$ | 5 | 2.3 | 2.55 | 88.2 | 1.65 |
| Example 8 | 3 | $TiO_2$ | 10 | 2.3 | 4.88 | 88.4 | 1.7 |
| Example 9 | 3 | $BaTiO_3$ | 1 | 5 | 1.15 | 87.7 | 1.66 |
| Example 10 | 3 | $BaTiO_3$ | 3 | 5 | 3.40 | 88.2 | 1.6 |
| Example 11 | 3 | $BaTiO_3$ | 5 | 5 | 5.55 | 88 | 1.6 |
| Example 12 | 3 | $BaTiO_3$ | 10 | 5 | 10.6 | 88.1 | 1.65 |

As shown in Table 1, the cell of Example 1, which did not contain $Li_3PO_4$ and did not contain a metal oxide particle, had a capacity retention ratio of 73.1% after the charge-discharge cycle test and thus lacked durability. In addition, the cell of Example 2, which contained $Li_3PO_4$ in the positive electrode active material layer and did not contain metal oxide particles in the negative electrode active material layer, did present an increase in the capacity retention ratio in comparison to Example 1, but this value remained at 86.2%. In contrast to this, the cells in Examples 3 to 12, which contained $Li_3PO_4$ in the positive electrode active material layer and contained metal oxide particles in the negative electrode active material layer, had higher capacity retention ratios than in Examples 1 and 2 and thus had better durabilities. These results confirmed that the capacity deterioration could be suppressed and the durability could be enhanced by the presence of $Li_3PO_4$ in the positive electrode to 12, but using a metal hydroxide in place of the metal oxide particle. In addition, the initial resistance and capacity retention ratio after charge-discharge cycle testing were measured using the same procedures as in the above-described Examples 1 to 12.

The following are given in Table 2 for the evaluation laminate cells according to Examples 1, 2, and 13 to 19: the content (mass parts) of $Li_3PO_4$ per 100 mass parts of the positive electrode active material; the type of metal hydroxide used; the content (mass parts) of the metal hydroxide per 100 mass parts of the negative electrode active material; the ratio (B/A) between the total number of moles B [mol] of OH groups in the metal hydroxide in the negative electrode active material layer and the total mass A [g] of the $Li_3PO_4$ in the positive electrode active material layer; the capacity retention ratio; and the initial resistance.

TABLE 2

| | positive electrode $Li_3PO_4$ content (mass parts) | negative electrode metal hydroxide | | total number of moles B of OH group in the metal hydroxide/total mass A of $Li_3PO_4$ (mol/g) | capacity retention ratio (%) | initial resistance (Ω) |
|---|---|---|---|---|---|---|
| | | type | content (mass parts) | | | |
| Example 1 | none | none | — | — | 73.1 | 1.26 |
| Example 2 | 3 | none | — | — | 86.2 | 1.64 |
| Example 13 | 3 | $Al(OH)_3$ | 1 | 0.010 | 87.9 | 1.63 |
| Example 14 | 3 | $Al(OH)_3$ | 3 | 0.026 | 87.8 | 1.66 |
| Example 15 | 3 | $Al(OH)_3$ | 5 | 0.043 | 88.4 | 1.7 |

TABLE 2-continued

| | positive electrode Li$_3$PO$_4$ content | negative electrode metal hydroxide | | total number of moles B of OH group in the metal hydroxide/total | capacity | initial |
|---|---|---|---|---|---|---|
| | (mass parts) | type | content (mass parts) | mass A of Li$_3$PO$_4$ (mol/g) | retention ratio (%) | resistance (Ω) |
| Example 16 | 3 | Al(OH)$_3$ | 10 | 0.082 | 87 | 1.92 |
| Example 17 | 3 | Fe(OH)$_2$ | 3 | 0.015 | 88 | 1.65 |
| Example 18 | 3 | Fe(OH)$_2$ | 5 | 0.025 | 88.3 | 1.6 |
| Example 19 | 3 | Fe(OH)$_2$ | 10 | 0.047 | 86.9 | 1.89 |

As shown in Table 2, the cells according to Examples 13 to 19, which contained Li$_3$PO$_4$ in the positive electrode active material layer and contained a metal hydroxide in the negative electrode active material layer, had a higher capacity retention ratio than Examples 1 and 2 and thus had a better durability. These results confirmed that the capacity deterioration could be suppressed and the durability could be improved by the presence of Li$_3$PO$_4$ in the positive electrode active material layer and the presence of metal hydroxide in the negative electrode active material layer. For the batteries submitted to testing here, a low resistance, of not more than 2Ω, could be realized by having the content of the metal hydroxide be not more than 10 mass parts per 100 mass parts of the negative electrode active material. In addition, a very low resistance, of not more than 1.7Ω, could be realized by having the content of the metal hydroxide be not more than 5 mass parts per 100 mass parts of the negative electrode active material. Viewed in terms of reducing the resistance, the content of the metal hydroxide may be not more than 10 mass parts (typically not more than 5 mass parts) per 100 mass parts of the negative electrode active material.

<Test Example 3>

Evaluation laminate cells according to Examples 20 to 27 were fabricated in this example using a layer compound as the phosphate ion scavenger in place of the metal oxide particle. The evaluation laminate cells were fabricated using the same procedures as in the above-described Examples 1 to 12, but using the layer compound in place of the metal oxide particle. In addition, the initial resistance and capacity retention ratio after charge-discharge cycle testing were measured using the same procedures as in the above-described Examples 1 to 12.

The following are given in Table 3 for the evaluation laminate cells according to Examples 1, 2, and 20 to 27: the content (mass parts) of Li$_3$PO$_4$ per 100 mass parts of the positive electrode active material; the type of layer compound used; the content (mass parts) of the layer compound per 100 mass parts of the negative electrode active material; the ratio (C/A) between the total number of moles C [mmol] of the layer compound in the negative electrode active material layer and the total mass A [g] of the Li$_3$PO$_4$ in the positive electrode active material layer; the capacity retention ratio; and the initial resistance.

TABLE 3

| | positive electrode | negative electrode layer compound | | total number of moles C of the layer compound/ | capacity | initial |
|---|---|---|---|---|---|---|
| | Li$_3$PO$_4$ content (mass parts) | type | content (mass parts) | total mass A of Li$_3$PO$_4$ (mmol/g) | retention ratio (%) | resistance (Ω) |
| Example 1 | none | none | — | — | 73.1 | 1.26 |
| Example 2 | 3 | none | — | — | 86.2 | 1.64 |
| Example 20 | 3 | Mg$_6$Al$_2$(OH)$_{16}$CO$_3$•4H$_2$O | 3 | 1.1 | 87.8 | 1.65 |
| Example 21 | 3 | Mg$_6$Al$_2$(OH)$_{16}$CO$_3$•4H$_2$O | 5 | 1.8 | 88 | 1.69 |
| Example 22 | 3 | Mg$_6$Al$_2$(OH)$_{16}$CO$_3$•4H$_2$O | 10 | 3.5 | 88.2 | 1.68 |
| Example 23 | 3 | Mg$_6$Al$_2$(OH)$_{16}$CO$_3$•4H$_2$O | 20 | 6.4 | 88 | 1.87 |
| Example 24 | 3 | Mg$_6$Al$_2$(Cl$_2$)(OH)$_{16}$•4H$_2$O | 3 | 1.1 | 88.2 | 1.63 |
| Example 25 | 3 | Mg$_6$Al$_2$(Cl$_2$) (OH)$_{16}$•4H$_2$O | 5 | 1.8 | 88.5 | 1.62 |
| Example 26 | 3 | Mg$_6$Al$_2$(Cl$_2$) (OH)$_{16}$•4H$_2$O | 10 | 3.4 | 88.3 | 1.67 |
| Example 27 | 3 | Mg$_6$Al$_2$(Cl$_2$) (OH)$_{16}$•4H$_2$O | 20 | 6.3 | 88.1 | 1.86 |

As shown in Table 3, the cells according to Examples 20 to 27, which contained Li$_3$PO$_4$ in the positive electrode active material layer and contained a layer compound in the negative electrode active material layer, had a higher capacity retention ratio than Examples 1 and 2 and thus had a better durability. These results confirmed that the capacity deterioration could be suppressed and the durability could be improved by the presence of Li$_3$PO$_4$ in the positive electrode active material layer and the presence of the layer compound in the negative electrode active material layer. For the batteries submitted to testing here, a low resistance, of not more than 2Ω, could be realized by having the content of the layer compound be not more than 20 mass parts per 100 mass parts of the negative electrode active material. In addition, a very low resistance, of not more than 1.7Ω, could be realized by having the content of the layer compound be not more than 10 mass parts per 100 mass parts of the negative electrode active material. Viewed in terms of reducing the resistance, the content of the layer compound may be not more than 20 mass parts (typically not more than 10 mass parts) per 100 mass parts of the negative electrode active material.

A nonaqueous electrolyte secondary battery according to an embodiment of the present invention has been described in the preceding, but the nonaqueous electrolyte secondary battery according to the present invention is not limited to or by any embodiment described above and various modifications are possible.

For example, the preceding embodiment has described a lithium ion secondary battery as a typical example of a nonaqueous electrolyte secondary battery, but there is no limitation to a nonaqueous electrolyte secondary battery of this type. It may be, for example, a nonaqueous electrolyte secondary battery in which the charge carrier is a metal ion other than the lithium ion (for example, the sodium ion).

In addition, the applications of the herein disclosed art are not limited to the wound type of electrode assembly described in the preceding. This may be, for example, a laminated electrode assembly in which the positive electrode current collector and the negative electrode current collector are both rectangular sheets and the positive electrode current collector and the negative electrode current collector are stacked with each other with their long directions aligned and with the positive electrode active material layer facing the negative electrode active material layer with a separator interposed therebetween. The effects described above can also be obtained in this case.

What is claimed is:

1. A nonaqueous electrolyte secondary battery comprising:
   a positive electrode comprising a positive electrode active material layer;
   a negative electrode comprising a negative electrode active material layer;
   a separator interposed between the positive electrode active material layer and the negative electrode active material layer; and
   a nonaqueous electrolyte solution,
   wherein
      the positive electrode active material layer contains a positive electrode active material and an inorganic phosphate compound that contains an alkali metal and/or an alkaline-earth metal, and
      a phosphate ion scavenger that scavenges a phosphate ion is disposed between the positive electrode active material layer and the negative electrode active material layer and/or in the negative electrode active material layer, and wherein
   the inorganic phosphate compound is $Li_3PO_4$, and
   the phosphate ion scavenger is at least one metal oxide particle selected from the group consisting of $ZrO_2$, $TiO_2$, and $BaTiO_3$.

2. The nonaqueous electrolyte secondary battery according to claim 1, wherein
   the ratio (S/A) between the total surface area S [$m^2$] of the metal oxide particles disposed between the positive electrode active material layer and the negative electrode active material layer and/or in the negative electrode active material layer and the total mass A [g] of the $Li_3PO_4$ present in the positive electrode active material layer is at least 1.15.

3. The nonaqueous electrolyte secondary battery according to claim 2, wherein
   the metal oxide particle is present in the negative electrode active material layer, and
   the content of the metal oxide particle present in the negative electrode active material layer is not more than 10 mass parts per 100 mass parts of the negative electrode active material.

* * * * *